US011283369B2

United States Patent
Fujiwara et al.

(10) Patent No.: US 11,283,369 B2
(45) Date of Patent: Mar. 22, 2022

(54) CONTROL DEVICE AND POWER CONTROL SYSTEM

(71) Applicant: Mitsubishi Electric Corporation, Tokyo (JP)

(72) Inventors: Shuhei Fujiwara, Tokyo (JP); Yoshiyuki Kono, Tokyo (JP); Kazuyori Tahata, Tokyo (JP); Masashi Shigemitsu, Tokyo (JP); Shota Midorikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 5 days.

(21) Appl. No.: 17/044,582

(22) PCT Filed: Jun. 7, 2018

(86) PCT No.: PCT/JP2018/021897
§ 371 (c)(1),
(2) Date: Oct. 1, 2020

(87) PCT Pub. No.: WO2019/234884
PCT Pub. Date: Dec. 12, 2019

(65) Prior Publication Data
US 2021/0021210 A1 Jan. 21, 2021

(51) Int. Cl.
*H02M 7/797* (2006.01)
*H02J 3/38* (2006.01)
(Continued)

(52) U.S. Cl.
CPC .............. *H02M 7/797* (2013.01); *H02J 3/38* (2013.01); *H02M 7/155* (2013.01); *H02M 7/217* (2013.01); *H02M 7/483* (2013.01)

(58) Field of Classification Search
CPC .................................................. H02M 7/797
(Continued)

(56) References Cited

U.S. PATENT DOCUMENTS

2009/0146500 A1\* 6/2009 Jones ...................... H02P 9/102
307/82
2013/0300196 A1\* 11/2013 Clark ........................ H02J 4/00
307/26

FOREIGN PATENT DOCUMENTS

JP 2011166890 A 8/2011

OTHER PUBLICATIONS

International Search Report (PCT/ISA/210), with translation, and Written Opinion (PCT/ISA/237) dated Jul. 10, 2018, by the Japan Patent Office as the International Searching Authority for International Application No. PCT/JP2018/021897.

\* cited by examiner

*Primary Examiner* — Joseph Chang
(74) *Attorney, Agent, or Firm* — Buchanan Ingersoll & Rooney PC

(57) ABSTRACT

A control device for controlling a power source connected to an alternating-current (AC) power system includes: a frequency control unit that controls a frequency of the power source operating in a constant-voltage constant-frequency control scheme; a power calculation unit that calculates, when the frequency control unit varies a frequency of the power source, a variation of an effective power output from the power source; an arithmetic unit that calculates a frequency characteristics constant of the AC power system, based on a variation of the frequency of the power source and the variation of the effective power output from the power source; and a selection unit that selects a control scheme for the power source, based on the frequency characteristics constant of the AC power system.

20 Claims, 6 Drawing Sheets

(51) Int. Cl.
*H02M 7/155* (2006.01)
*H02M 7/217* (2006.01)
*H02M 7/483* (2007.01)

(58) Field of Classification Search
USPC .......................................................... 307/82
See application file for complete search history.

CONTROL DEVICE AND POWER CONTROL SYSTEM

TECHNICAL FIELD

The present disclosure relates to a control device and a power control system.

BACKGROUND ART

In the operation of a power system, load variations and frequency changes within the power system are closely related, which is called a power system frequency characteristics. One needs to understand the frequency characteristics when planning, and operating and manipulating the power system.

For example, Japanese Patent Laying-Open No. 2011-166890 (PTL 1) discloses a method of measurement of a system frequency characteristics constant in a power system. In this measurement method, an output of a generator connected to the power system or a cyclic minute variation provided to the power consumption of a load connected to the power system is input to a lock-in amplifier as a reference signal, the frequency of the power system is input to the lock-in amplifier as a measurement signal, the minute variation and a direct-current (DC) output of the lock-in amplifier are input to an arithmetic apparatus, and the arithmetic apparatus determines a system frequency characteristics constant, based on the minute variation and the DC output input thereto.

CITATION LIST

Patent Literature

PTL 1: Japanese Patent Laying-Open No. 2011-166890

SUMMARY OF INVENTION

Technical Problem

A black start is known which is the process of recovering, in the event of a power outage in a power system, the power system from the power outage state by autonomously starting a predetermined power source, without receiving a power generated by another power source (e.g., a generator) connected to the power system. After starting the predetermined power source, the frequency characteristics of the power system changes as the other power source (e.g., the generator) is connected to the power system. For this reason, a control scheme for the predetermined power source needs to be selected as appropriate by successively understanding the frequency characteristics constant.

PTL 1, while it calculates the frequency characteristics constant by varying the output of the generator or load connected to the power system, does not assume launching the power system through the black start. PTL 1 thus fails to teach or suggest any technique to meet the above needs.

An object of the present disclosure according to a certain aspect is to provide a control device and a power control system which select, as appropriate, a control scheme for a power source connected to a power system by varying the frequency of the power source.

Solution to Problem

According to a certain embodiment, a control device for controlling a power source connected to an alternating-current (AC) power system is provided. The control device includes: a frequency control unit that controls a frequency of the power source operating in a constant-voltage constant-frequency control scheme; a power calculation unit that calculates, when the frequency control unit varies the frequency of the power source, a variation of an effective power output from the power source; an arithmetic unit that calculates a frequency characteristics constant of the AC power system, based on a variation of the frequency of the power source and the variation of the effective power output from the power source; and a selection unit that selects a control scheme for the power source, based on the frequency characteristics constant of the AC power system.

A power control system according to another embodiment includes: a power source connected to an alternating-current (AC) power system; and a control device for controlling the power source. The control device includes: a frequency control unit that controls a frequency of the power source operating in a constant-voltage constant-frequency control scheme; a power calculation unit that calculates, when the frequency control unit varies the frequency of the power source, a variation of an effective power output from the power source; an arithmetic unit that calculates a frequency characteristics constant of the AC power system, based on a variation of the frequency of the power source and the variation of the effective power output from the power source; and a selection unit that selects a control scheme for the power source, based on the frequency characteristics constant of the AC power system.

Advantageous Effects of Invention

According to the present disclosure, a control scheme can be selected, as appropriate, for a power source connected to the power system, by varying the frequency of the power source.

DESCRIPTION OF EMBODIMENTS

Hereinafter, an embodiment according to the present invention is described, with reference to the accompanying drawings. In the following description, like reference signs refer to like parts. Their names and functionalities are also the same. Thus, detailed description thereof will not be repeated.

<Outline of System>
(Overall Configuration)

Figure 1:
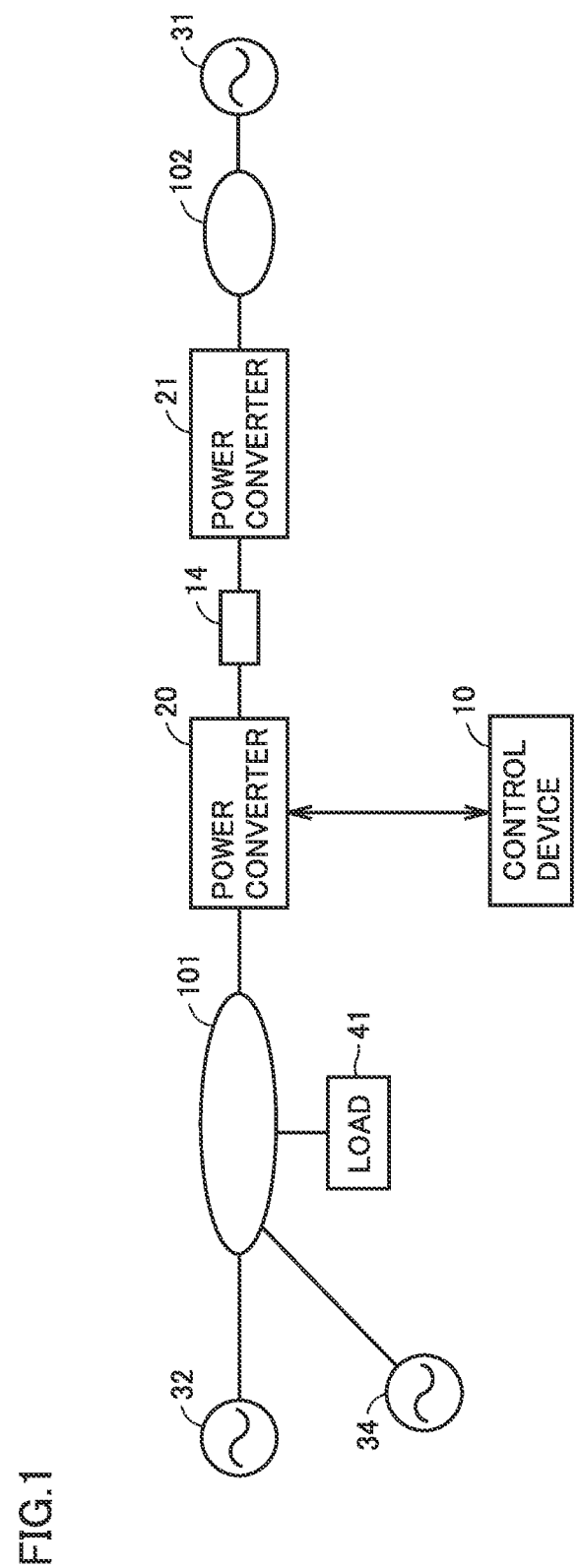
FIG. 1 is a diagram showing a schematic configuration of a power control system.

FIG. 1 is a diagram showing a schematic configuration of a power control system. Referring to FIG. 1, the power control system is a system for controlling the power of a direct-current (DC) power transmission system. Power is transmitted and received between an alternating-current (AC) power system 101 and an AC power system 102 via a DC transmission line 14 which is a DC power system. Typically, AC power system 101 and AC power system 102 are three-phase AC power systems.

AC power system 101 is connected to a power converter 20, generators 32, 34, as AC power supplies, and a load 41. Power converter 20 is connected between AC power system 101 and DC transmission line 14. AC power system 102 is connected to a power converter 21 and a generator 31. Power converter 21 converts power between AC power system 102 and DC transmission line 14.

For example, a power is transmitted from AC power system 102 to AC power system 101. In this case, power converter 20 operates as a rectifier (REC), and power converter 21 operates as an inverter (INV). Specifically, AC power is converted to DC power by power converter 21, and the DC power is dc transmitted via DC transmission line 14. The DC power is then converted to AC power by power converter 20 at the receiving end, and the AC power is supplied to AC power system 101 via a transformer (not shown). Note that the opposite conversion operation from the above is performed when power converter 21 operates as an inverter and power converter 20 operates as a rectifier.

Power converter 20 is configured of a self-excited, voltage-type power converter. For example, power converter 20 is configured of a modular multilevel converter which includes multiple sub-modules connected in series. The "sub-module" is also referred to as a "converter cell." Note that power converter 21 is also configured of a self-excited, voltage-type power converter.

A control device 10 obtains electrical quantities (current, voltage, etc.), for use in control of power converter 20, from multiple detectors. Based on the electrical quantities obtained from the multiple detectors, control device 10 controls operation of power converter 20.

In the present embodiment, since power converter 20 is a self-excited power converter, AC power system 101 can be recovered from the power outage state by causing power converter 20 to operate as a power source (i.e., a voltage source) of AC power system 101 and supplying AC power system 101 with power from power converter 20.

Specifically, power converter 20 has a black start functionality for recovering AC power system 101 from the power outage state, without receiving power from another power source (e.g., generators 32, 34) connected to AC power system 101. Note that it is assumed that various backup powers (a power source for the control device, an auxiliary power source, etc.) are ensured, which enable power converter 20 to operate even when AC power system 101 is in the power outage state. Alternatively, when AC power system 101 is interrupted, power converter 20 may be operated with supply of power from generator 31 via DC transmission line 14.

Here, assume that AC power system 101 is in the power outage state and generators 32, 34 and load 41 are disconnected from AC power system 101. Note that generators 32, 34 and load 41 each have frequency characteristics. Specifically, generators 32, 34 each have a frequency droop control functionality, in which as the frequency of the generator increases, the generator output (i.e., effective power output of the generator) is reduced, and as the frequency decreases, the effective power output is increased, in accordance with a predetermined the slope (i.e., a regulation rate). Moreover, the load power of load 41 increases with an increase of the frequency of load 41, and decreases with a reduction of the frequency.

Control device 10 switches control schemes for power converter 20, based on a frequency characteristics constant of AC power system 101, to recover AC power system 101 from the power outage state. Specifically, initially, control device 10 causes power converter 20 to operate in a constant-voltage constant-frequency (CVCF) control scheme, thereby causing power converter 20 to function as a voltage source of AC power system 101.

Next, control device 10 varies a frequency F of power converter 20 and measures a variation of an effective power output P of power converter 20 in response to the variation in frequency of power converter 20. A frequency characteristics constant K of AC power system 101 is represented by:

$$K = \Delta P / \Delta f \qquad (1)$$

where Δf denotes a frequency variation, which is a variation value of frequency F, and ΔP denotes an effective power variation, which is a variation value of effective power output P. While generators 32, 34 and load 41 are disconnected from AC power system 101, effective power output P does not vary when the frequency F of power converter 20 varies. Because, in this condition, neither power source nor load that have frequency characteristics are connected to AC power system 101, although frequency F of power converter 20 is varied.

When generators 32, 34 and load 41 are not connected to AC power system 101, frequency characteristics constant K of AC power system 101 is substantially zero. In this case, control device 10 causes power converter 20 to operate in the CVCF control scheme, continuing to cause power converter 20 to function as the voltage source of AC power system 101.

Subsequently, as generators 32, 34 and load 41 are sequentially connected to AC power system 101, the frequency characteristics of AC power system 101 changes (i.e., frequency characteristics constant K changes). Therefore, as frequency F of power converter 20 is varied, effective power output P of power converter 20 varies accordingly.

Specifically, power converter 20 in operation in the CVCF control scheme is responsible for rendering the frequency of AC power system 101 constant. For example, assume a scenario in which generator 32 is connected to AC power system 101. If power converter 20 increases frequency F from a reference frequency Fs (e.g., 50 Hz or 60 Hz) by Δf (i.e., F=Fs+Δf), generator 32 reduces the effective power output thereof as a function of Δf, which is the increase of the frequency, at which time the power converter 20 operates to maintain frequency F at the frequency (Fs+Δf) by increasing effective power output P thereof by the reduction of the effective power output of generator 32.

If power converter 20 decreases frequency F from reference frequency Fs by Δf (i.e., when F=Fs−Δf), generator 32 increases the effective power output thereof as a function of Δf which is the reduction of the frequency of power converter 20. Power converter 20 operates to maintain frequency F at the frequency (Fs−Δf) by reducing effective power output P thereof by the increase of the effective power output of generator 32.

Therefore, control device 10 confirms a variation of effective power output P of power converter 20 when frequency F of power converter 20 is varied (i.e., confirms frequency characteristics constant K), thereby understanding the frequency characteristics of AC power system 101. Control device 10 then switches the control scheme of power converter 20 to another control scheme (e.g., a frequency droop control scheme, an effective power constant control scheme, etc.) different from the CVCF control scheme, as a function of the value of frequency characteristics constant K.

As the above, control device 10 periodically varies frequency F of power converter 20 to calculate frequency characteristics constant K, which is a variation of effective power output P relative to a variation of frequency F, and, based on frequency characteristics constant K, causes power converter 20 to operate in a control scheme that is appropriate for the current state of AC power system 101.

Control device 10 can also appropriately select a control scheme for power converter 20, using only the information that is related to power converter 20 (i.e., variations of frequency F and effective power output P of power converter 20). Furthermore, there is no need to obtain command information (e.g., command information for the control scheme) from a higher-level device that manages the entirety of AC power system 101, such as a centralized control device, thereby achieving a reduced communication cost and allowing AC power system 101 to be promptly recovered from the power outage state.

<Configuration of Power Converter>

(Overall Configuration)

Figure 2:
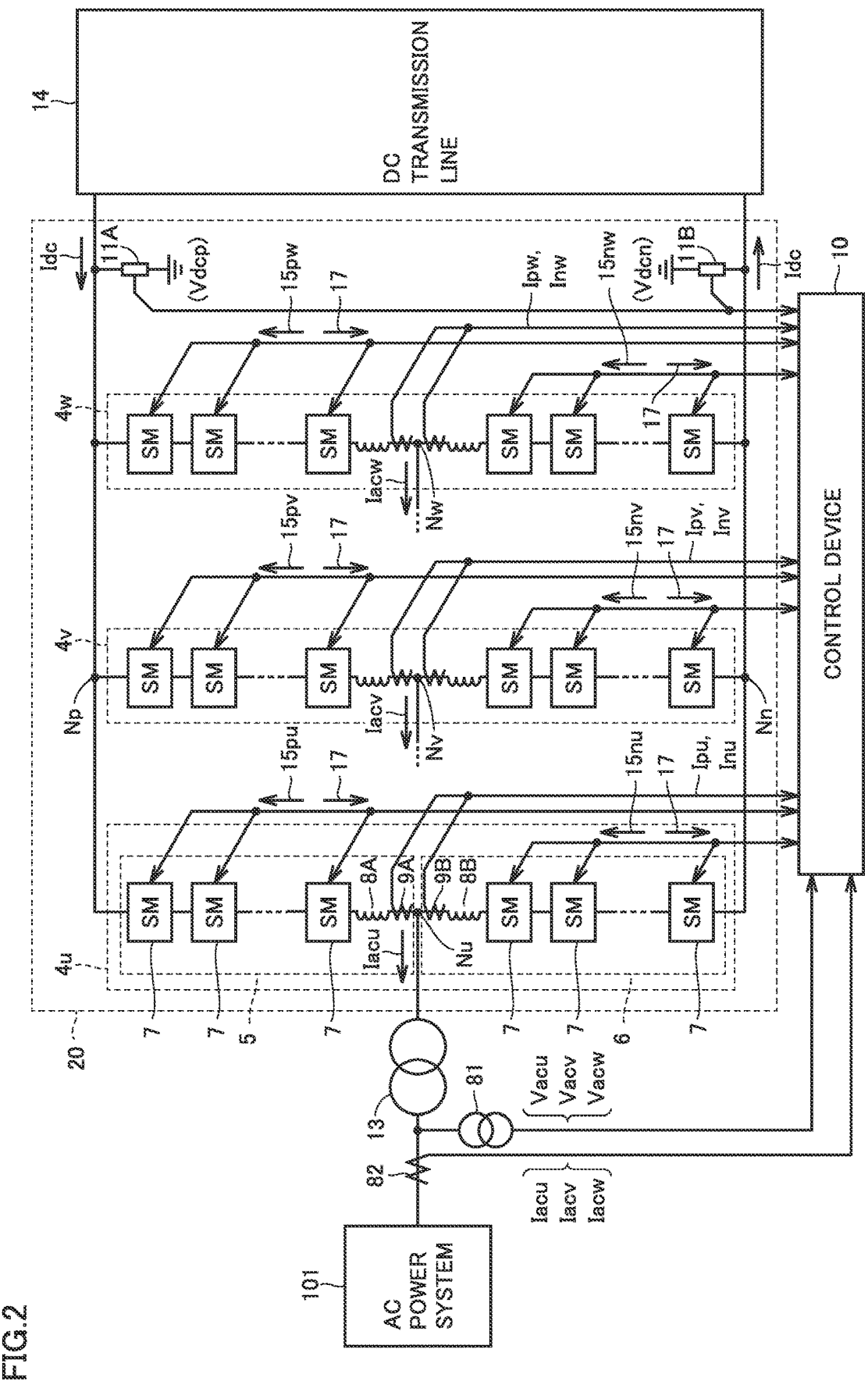
FIG. 2 is a schematic configuration diagram of a power converter.

FIG. 2 is a schematic configuration diagram of power converter 20. Referring to FIG. 2, power converter 20 includes multiple leg circuits 4u, 4v, 4w (hereinafter, also referred to as a "leg circuit 4") which are connected in parallel between a positive DC terminal (i.e., a high-potential-side DC terminal) Np and a negative DC terminal (i.e., a low-potential-side DC terminal) Nn. Leg circuit 4 is provided for each of the AC phases. Leg circuit 4 converts power between AC power system 101 and DC transmission line 14. In FIG. 2, three leg circuits 4u, 4v, 4w are provided, respectively, for U-phase, V-phase, and W-phase of AC power system 101.

AC input terminals Nu, Nv, Nw, respectively provided for leg circuits 4u, 4v, 4w, are connected to an interconnection transformer 13. In FIG. 2, for ease of illustration, the connections between AC input terminals Nv, Nw and interconnection transformer 13 are not shown. The high-potential-side DC terminal Np and the low-potential-side DC terminal Nn, which are commonly connected each leg circuit 4, are connected to DC transmission line 14.

Instead of interconnection transformer 13 of FIG. 1, an interconnection reactor may be used. Furthermore, instead of AC input terminals Nu, Nv, Nw, the primary windings may be provided for each of leg circuits 4u, 4v, 4w, and leg circuits 4u, 4v, 4w may be connected to interconnection transformer 13 or the interconnection reactor in an AC manner via the secondary winding magnetically coupled to the primary winding. In this case, the primary winding may be reactors 8A, 8B described below. In other words, leg circuit 4 is electrically (i.e., a DC manner or an AC manner) connected to AC power system 101 via the connector provided for each of leg circuits 4u, 4v, 4w, such as AC input terminals Nu, Nv, Nw or the above primary winding.

Leg circuit 4u includes an upper arm 5 and a lower arm 6, the upper arm 5 extending from high-potential-side DC terminal Np to AC input terminal Nu, the lower arm 6 extending from low-potential-side DC terminal Nn to AC input terminal Nu. AC input terminal Nu, which is the point of connection between upper arm 5 and lower arm 6, is connected to interconnection transformer 13. High-potential-side DC terminal Np and low-potential-side DC terminal Nn are connected to DC transmission line 14. Leg circuits 4v, 4w have the same configuration as leg circuit 4u, and leg circuit 4u will thus be representatively described below.

Upper arm 5 includes multiple cascade-connected sub-modules 7 and a reactor 8A. Multiple sub-modules 7 and reactor 8A are connected in series. Similarly, lower arm 6 includes multiple cascade-connected sub-modules 7 and reactor 8B. Multiple sub-modules 7 and reactor 8B are connected in series.

The location where reactor 8A is placed may be anywhere in upper arm 5 of leg circuit 4u, and the location where reactor 8B is placed may be anywhere in lower arm 6 of leg circuit 4u. Multiple reactors 8A and multiple reactors 8B may be placed. The reactors may have different inductance values. Furthermore, only reactor 8A of upper arm 5 may be provided, or only reactor 8B of lower arm 6 may be provided.

Reactors 8A, 8B are provided to prevent a rapid increase of a fault current in the event of a fault of AC power system 101 or DC transmission line 14, for example. However, reactors 8A, 8B having excessive inductance values result in reduced efficiency of the power converter. Accordingly, preferably, all the switching elements of each sub-module 7 are stopped (turned off) as soon as possible in the event of a fault.

Power converter 20 further includes an AC voltage detector 81, an AC current detector 82, DC voltage detectors 11A, 11B, and arm current detectors 9A, 9B as detectors for measuring the electrical quantities (current, voltage, etc.) for use in the control of power converter 20. Arm current detectors 9A, 9B are provided for each leg circuit 4.

Signals detected by these detectors are input to control device 10. Based on the detection signals, control device 10 outputs control commands 15pu, 15nu, 15pv, 15ny, 15pw, 15nw for controlling the operating state of each sub-module 7. Control device 10 also receives a signal 17 from each sub-module 7. Signal 17 contains a detection value of a capacitor voltage (a voltage of a DC capacitor 24 of FIG. 3 described below).

Control commands 15pu, 15nu, 15pv, 15ny, 15pw, 15nw (hereinafter, also collectively referred to as a "control command 15") are generated respectively corresponding to the U-phase upper arm, the U-phase lower arm, the V-phase upper arm, the V-phase lower arm, the W-phase upper arm, and the W-phase lower arm.

Note that, for ease of illustration, in FIG. 2, some of signal lines for the signals input from the detectors to control device 10, and signal lines for the signals input and output between control device 10 and sub-modules 7 are collectively depicted, but they are, in practice, provided for each detector and each sub-module 7. Signal lines may be provided separately for transmission and receipt of the signal between each sub-module 7 and control device 10. In the present embodiment, from the standpoint of noise tolerance, these signals are transmitted via optical fibers.

In the following, each detector is described in detail. AC voltage detector 81 detects U-phase AC voltage value Vacu, V-phase AC voltage value Vacv, and W-phase AC voltage value Vacw of AC power system 101. AC current detector 82 detects a U-phase AC current value Iacu, a V-phase AC current value Iacv, and a W-phase AC current value Iacw of AC power system 101. DC voltage detector 11A detects a DC voltage value Vdcp of high-potential-side DC terminal Np connected to DC transmission line 14. DC voltage detector 11B detects a DC voltage value Vdcn of low-potential-side DC terminal Nn connected to DC transmission line 14.

Arm current detectors 9A and 9B, included in leg circuit 4u for U phase, detect an upper-arm current Ipu flowing through upper arm 5 and a lower-arm current Inu flowing through lower arm 6, respectively. Similarly, arm current detectors 9A and 9B, included in leg circuit 4v for V phase, detect an upper arm current Ipv and a lower arm current Inv, respectively. Arm current detectors 9A and 9B, included in leg circuit 4w for W phase, detect an upper arm current Ipw and a lower arm current Inw, respectively.

(Example Configuration of Sub-Module)

Figure 3:
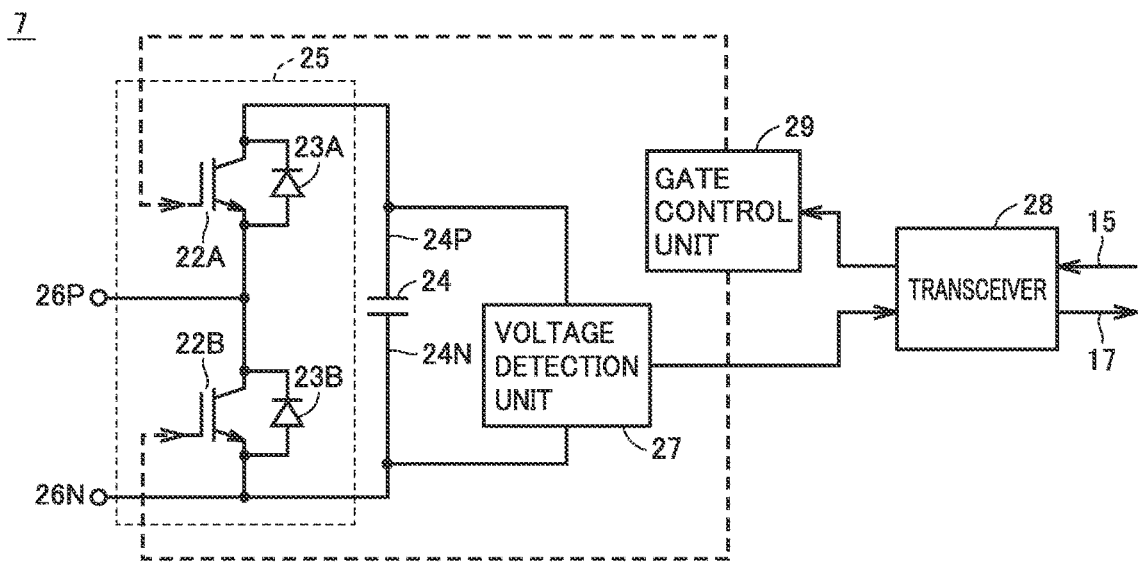
FIG. 3 is a circuit diagram showing one example of a sub-module included in each leg circuit of FIG. 2.

FIG. 3 is a circuit diagram showing one example of the sub-module included in each leg circuit of FIG. 2. Sub-module 7 shown in FIG. 3 includes a half-bridge converter circuit 25, a DC capacitor 24 as an energy storage, a voltage detection unit 27, a transceiver 28, and a gate control unit 29.

Half-bridge converter circuit 25 includes switching elements 22A, 22B connected in series, and diodes 23A, 23B. Diodes 23A, 23B are connected in anti-parallel (i.e., in parallel and in the reverse bias direction) with switching elements 22A, 22B, respectively. DC capacitor 24 is connected in parallel with series connected circuits of switching elements 22A, 22B, and holds a DC voltage. A connection node between switching elements 22A, 22B is connected to a high-potential-side input-output terminal 26P. A connection node between switching element 22B and DC capacitor 24 is connected to a low-potential-side input-output terminal 26N.

Gate control unit 29 receives control command 15 from control device 10, and operates in accordance with the control command 15. In normal operation (i.e., when gate control unit 29 outputs a zero voltage or a positive voltage between input-output terminals 26P and 26N), gate control unit 29 controls switching elements 22A and 22B so that one of switching elements 22A and 22B is on and the other one of switching elements 22A and 22B is off. When switching element 22A is on and switching element 22B is off, a voltage across DC capacitor 24 is applied between input-output terminals 26P and 26N. Conversely, when switching element 22A is off and switching element 22B is on, the voltage between input-output terminals 26P and 26N is 0 V.

Accordingly, sub-module 7 shown in FIG. 3 turns on switching elements 22A, 22B alternately, thereby outputting a zero voltage or a positive voltage that is dependent on the voltage of DC capacitor 24. Diodes 23A, 23B are provided for protection of switching elements 22A, 22B upon application of reverse voltages to switching elements 22A and 22B.

In contrast, control device 10 transmits a gate block (a switching element turning off) command to transceiver 28 if detected that the arm current is overcurrent. As gate control unit 29 receives the gate block command via transceiver 28, gate control unit 29 turns off switching elements 22A, 22B to protect the circuit. As a result, switching elements 22A, 22B can be protected in the event of a ground fault of AC power system 101, for example.

Voltage detection unit 27 detects a voltage between opposing ends 24P, 24N of DC capacitor 24. In the following description, the voltage of DC capacitor 24 is also referred to as a cell capacitor voltage. Transceiver 28 conveys control command 15, received from control device 10, to gate control unit 29, and transmits to control device 10 signal 17 representing the cell capacitor voltage detected by voltage detection unit 27.

The above voltage detection unit 27, transceiver 28, and gate control unit 29 may each be configured by a dedicated circuit, or configured using a FPGA (Field Programmable Gate Array), for example. A self-arc-extinguishing switching element that is capable of controlling the on operation and off operation thereof is used for each of switching elements 22A, 22B. Switching elements 22A, 22B are, for example, IGBTs (Insulated Gate Bipolar Transistor) or GCTs (Gate Commutated Turn-off thyristor).

The configuration of sub-module 7 described above is by way of example, and sub-module 7 that has other configuration may be applied to the present embodiment. For example, sub-module 7 may be configured using a full-bridge converter circuit or a three-quarter-bridge converter circuit.

<Hardware Configuration of Control Device>

Figure 4:
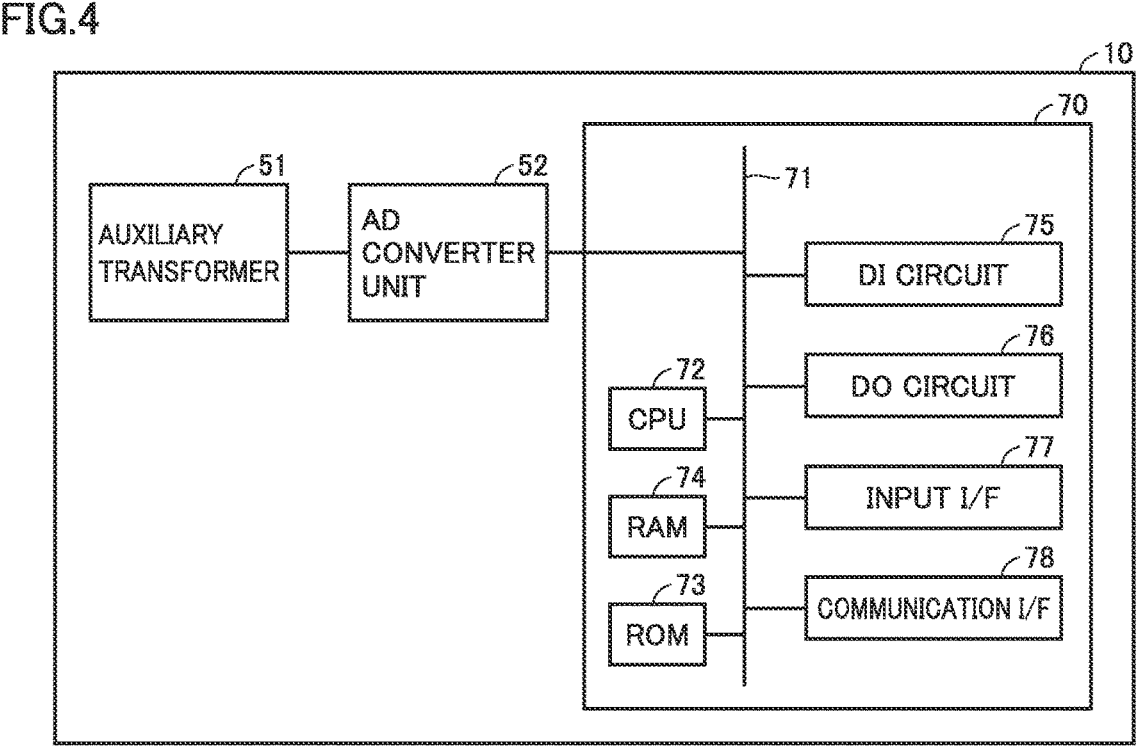
FIG. 4 is a diagram illustrating one example hardware configuration of a control device.

FIG. 4 is a diagram illustrating one example hardware configuration of control device 10. Referring to FIG. 4, control device 10 includes an auxiliary transformer 51, an analog-to-digital (AD) converter unit 52, and an arithmetic processing unit 70. For example, control device 10 is configured as a digital protection and control device.

Auxiliary transformer 51 takes in the electrical quantity from each detector, converts the electrical quantity to a smaller electrical quantity, and outputs the smaller electrical quantity. AD converter unit 52 takes in the electrical quantity (an analog quantity) output from auxiliary transformer 51, and converts the electrical quantity to digital data. Specifically, AD converter unit 52 includes an analog filter, a sample hold circuit, a multiplexer, and an AD converter.

The analog filter removes a high-frequency noise component from waveform signals of the current and voltage that are output from auxiliary transformer 51. The sample hold circuit samples the waveform signals of the current and voltage output from the analog filter in predetermined sampling cycles. The multiplexer sequentially switches the waveform signals, input from the sample hold circuit, on a time-series basis, based on a timing signal input from arithmetic processing unit 70, and inputs the waveform signal to the AD converter. The AD converter converts the waveform signal, input from the multiplexer, from analog data to digital data. The AD converter outputs the waveform signal (digital data) having through the digital conversion, to arithmetic processing unit 70.

Arithmetic processing unit 70 includes a central processing unit (CPU) 72, a ROM 73, a RAM 74, a digital input (DI) circuit 75, a digital output (DO) circuit 76, an input interface (I/F) 77, and a communication interface (I/F) 78, which are coupled together by a bus 71.

CPU 72 reads and executes programs pre-stored in ROM 73, thereby controlling the operation of control device 10. Note that ROM 73 is storing various pieces of information that are used by CPU 72. CPU 72 is, for example, a microprocessor. Note that the hardware may be other than a CPU, such as an FPGA (Field Programmable Gate Array), ASIC (Application Specific Integrated Circuit), and any other circuit that has arithmetic functions.

CPU 72 takes in the digital data from AD converter unit 52 via bus 71. Using the digital data, CPU 72 performs a control operation, according to a program stored in ROM 73.

Based on a result of the control operation, CPU 72 outputs a control command to an external device via DO circuit 76. CPU 72 also receives a response to the control command via DI circuit 75. Input interface 77 is, typically, various buttons or the like, and receives configuration actions from a system operator. CPU 72 also transmits/receives various pieces of information to/from other device via communication interface 78.

<Functional Configuration>

Figure 5:
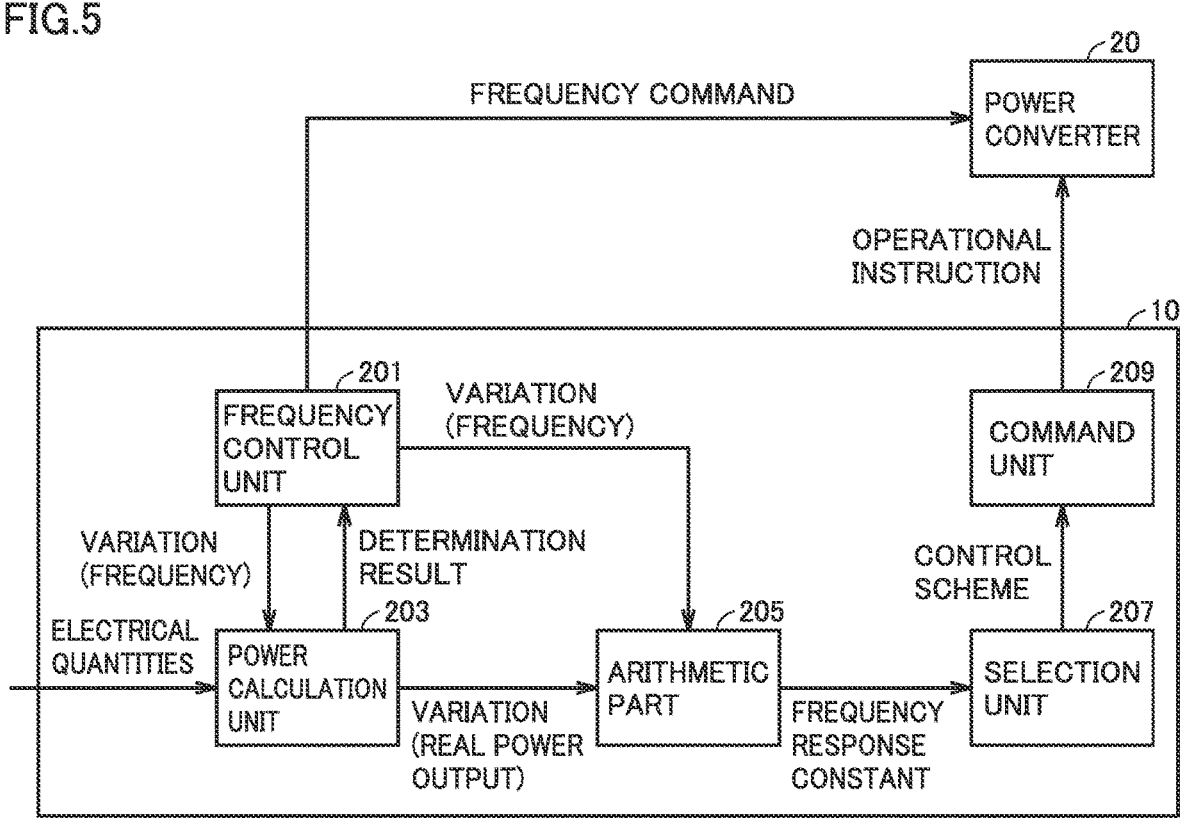
FIG. 5 is a block diagram showing one example functional configuration of the control device.

FIG. 5 is a block diagram showing one example functional configuration of control device 10. Referring to FIG. 5, control device 10 includes, as primarily functional configurations, a frequency control unit 201, a power calculation unit 203, an arithmetic unit 205, a selection unit 207, and a command unit 209. These functions are implemented by, for example, CPU 72 of arithmetic processing unit 70 executing programs stored in ROM 73. Note that some or all of these functions may be implemented in hardware.

Frequency control unit 201 provides power converter 20 with a frequency command, thereby controlling the frequency of power converter 20. In a certain aspect, frequency control unit 201 varies frequency F of power converter 20, which is operating in the CVCF control scheme, by Δf. Typically, frequency control unit 201 varies frequency F from reference frequency Fs by Δf.

More specifically, based on a speed at which generators 32, 34, connected to AC power system 101, changes the output (specifically, a response speed of a speed governor), frequency control unit 201 sets a time period T for which the frequency (e.g., F=Fs±Δf), resulting from varying frequency F, is maintained.

Figure 6:
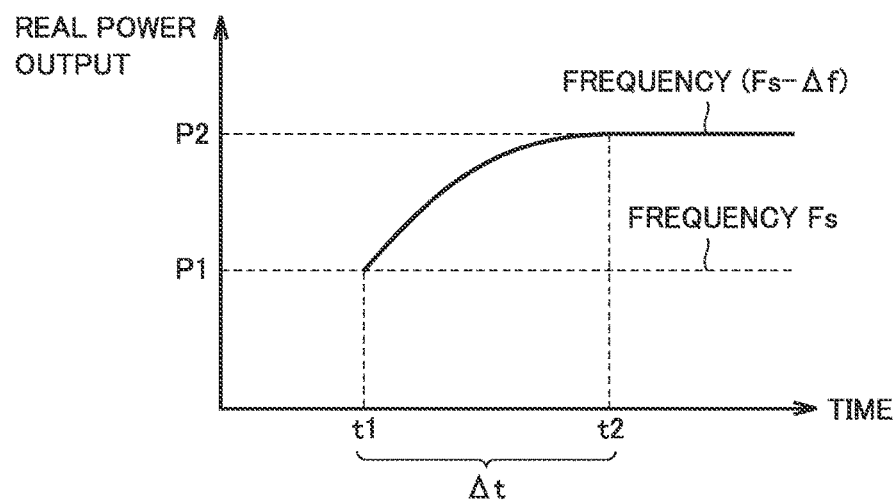
FIG. 6 is a diagram for illustrating a response speed of a generator.

FIG. 6 is a diagram for illustrating the response speed of generator 32.

Referring to FIG. 6, the effective power output of generator 32 is P1 for reference frequency Fs, and the effective power output of generator 32 is P2 for the frequency (Fs−Δf).

As shown in FIG. 6, a time necessary for the effective power output of generator 32 to change from P1 to P2, where frequency F of power converter 20 decreases from reference frequency Fs by Δf, is Δt (=t2−t1). In other words, the response speed of generator 32 is "(P2−P1)/Δt." Therefore, when varying frequency F by Δf, frequency control unit 201 sets time period T, for which the varied frequency is maintained, to a time period longer than Δt.

Note that control device 10 pre-stores the information related to the response speed of each generator connectable to AC power system 101 in ROM 73 or RAM 74. Typically, frequency control unit 201 sets time period T for which the varied frequency is maintained, based on a response speed of a generator which is the slowest response speed among the generators.

Referring again to FIG. 5, power calculation unit 203 calculates an effective power to be output from power converter 20. Specifically, power calculation unit 203 calculates effective power output P of power converter 20, based on the AC voltage detected by AC voltage detector 81 and the AC current detected by AC current detector 82.

In a certain aspect, power calculation unit 203 calculates a variation of effective power output P of power converter 20 when frequency control unit 201 varies frequency F of power converter 20. As the above, frequency control unit 201 sets time period T for which the varied frequency is maintained, based on the response speed of each generator connectable to AC power system 101. Therefore, power calculation unit 203 can calculate, with accuracy, a variation of the effective power output of AC power system 101 (i.e., effective power output P of power converter 20) when frequency F is varied.

In other aspect, power calculation unit 203 determines whether effective power output P of power converter 20 has reached the maximum output or the minimum output, in response to the variation in frequency F, and transmits a result of the determination to frequency control unit 201. If received a determination that effective power output P is not reached the maximum output or the minimum output, frequency control unit 201 sets frequency F to the frequency (Fs−Δf) and maintains the frequency (Fs−Δf) for time period T.

In contrast, if received a determination that effective power output P has reached the maximum output or the minimum output, frequency control unit 201 restores frequency F to reference frequency Fs, and varies frequency F again, using frequency variation Δf that is reduced less than the previous value, for the following reasons.

Specifically, power converter 20 operating in the CVCF control scheme, when frequency F is increased, increases effective power output P thereof by the reduction of the effective power output of another power source (e.g., generators 32, 34), thereby maintaining frequency F constant. In this case, depending on the reduction of the effective power output of the other power source, effective power output P may reach the maximum output. Effective power output P reaching the maximum output means that this is beyond the frequency tuning capability of power converter 20 (i.e., frequency F cannot be maintained constant). As a result, frequency characteristics constant K of AC power system 101 cannot be calculated with accuracy, too.

Power converter 20, when frequency F is reduced, reduces effective power output P thereof by an increase of the effective power output of the other power source, thereby maintaining frequency F constant. In this case, effective power output P may reach the minimum output, which is beyond the frequency tuning capability of power converter 20, meaning that frequency characteristics constant K of AC power system 101 cannot be calculated with accuracy.

Accordingly, when effective power output P reaches the maximum output or the minimum output, frequency control unit 201 restores frequency F to reference frequency Fs, and varies frequency F again, using variation Δf that is reduced less than the previous value.

Arithmetic unit 205 calculates frequency characteristics constant K for AC power system 101, based on variation Δf of frequency F and variation ΔP of the effective power output of power converter 20. Specifically, arithmetic unit 205 calculates frequency characteristics constant K, using Equation (1) above.

In a certain aspect, each time frequency control unit 201 performs the control of varying frequency F of power converter 20, arithmetic unit 205 calculates and updates frequency characteristics constant K of AC power system 101, based on variation Δf of frequency F and variation ΔP of effective power output P of power converter 20.

In other aspect, arithmetic unit 205 subtracts the frequency characteristics constant of load 41, connected to AC power system 101, from the calculated frequency characteristics constant K, thereby calculating the frequency characteristics constants for generators 32 and 34 connected to AC power system 101.

Selection unit 207 selects a control scheme for power converter 20, based on frequency characteristics constant K of AC power system 101. In a certain aspect, if frequency characteristics constant K of AC power system 101 is less than a threshold Th1, selection unit 207 selects the CVCF control scheme as the control scheme for power converter 20. Specifically, if frequency characteristics constant K is less than threshold Th1, AC power system 101 is considered as not having the capability of maintaining the frequency constant. Thus, in order to cause power converter 20 to function as a power source for allowing AC power system 101 to maintain the frequency of AC power system 101 constant, the CVCF control scheme is selected.

In other aspect, if frequency characteristics constant K is greater than or equal to threshold Th1 and less than a threshold Th2 (where Th2>Th1), selection unit 207 selects the frequency droop control scheme as the control scheme for power converter 20. Specifically, if frequency characteristics constant K is greater than or equal to threshold Th1 and less than threshold Th2, AC power system 101 is considered as having some degree of capability of maintaining the frequency constant. Thus, in order to maintain the frequency of AC power system 101 constant by power converter 20 and another power source (e.g., generators 32, 34) connected to AC power system 101, the frequency droop control scheme is selected. Note that the coefficient indicating the slope of droop characteristics of power converter 20 in this case is the reciprocal of frequency characteristics constant K calculated by arithmetic unit 205.

In still another aspect, if frequency characteristics constant K is greater than or equal to threshold Th2, selection unit 207 selects the effective power constant control scheme as the control scheme for power converter 20. Specifically, if frequency characteristics constant K is greater than or equal to threshold Th2, AC power system 101 is considered as having a sufficient capability of maintaining the frequency constant. Thus, selection unit 207 selects the effective power constant control scheme as the control scheme for power converter 20, the effective power constant control scheme not contributing to the frequency maintaining capability.

Command unit 209 transmits to power converter 20 an operational instruction for causing power converter 20 to operate in the control scheme selected by selection unit 207.

<Process Steps>

Figure 7:
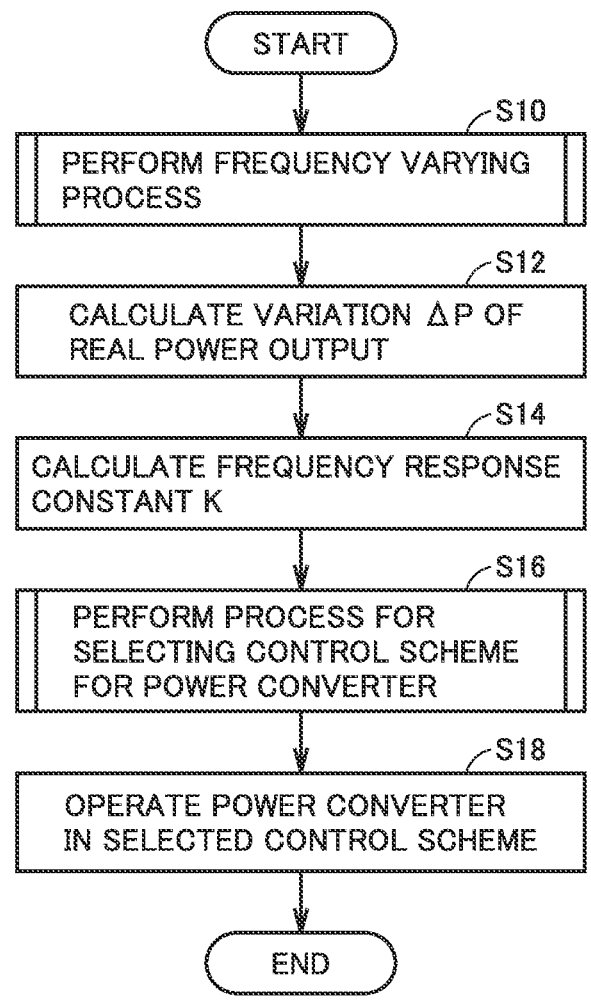
FIG. 7 is a flowchart showing one example of process steps performed by the control device.
Figure 8:
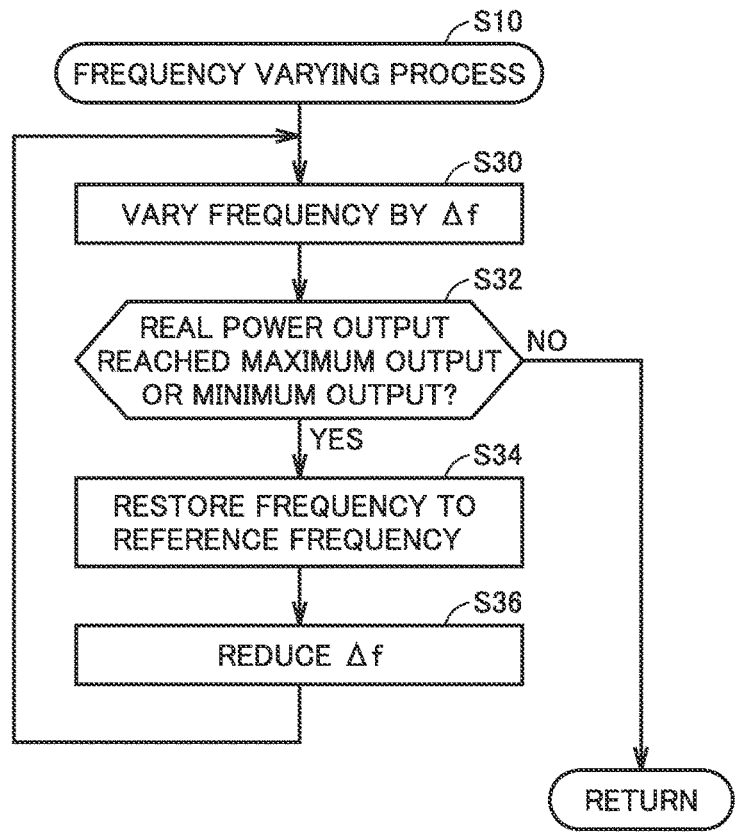
FIG. 8 is a flowchart showing one example of a frequency varying process.
Figure 9:
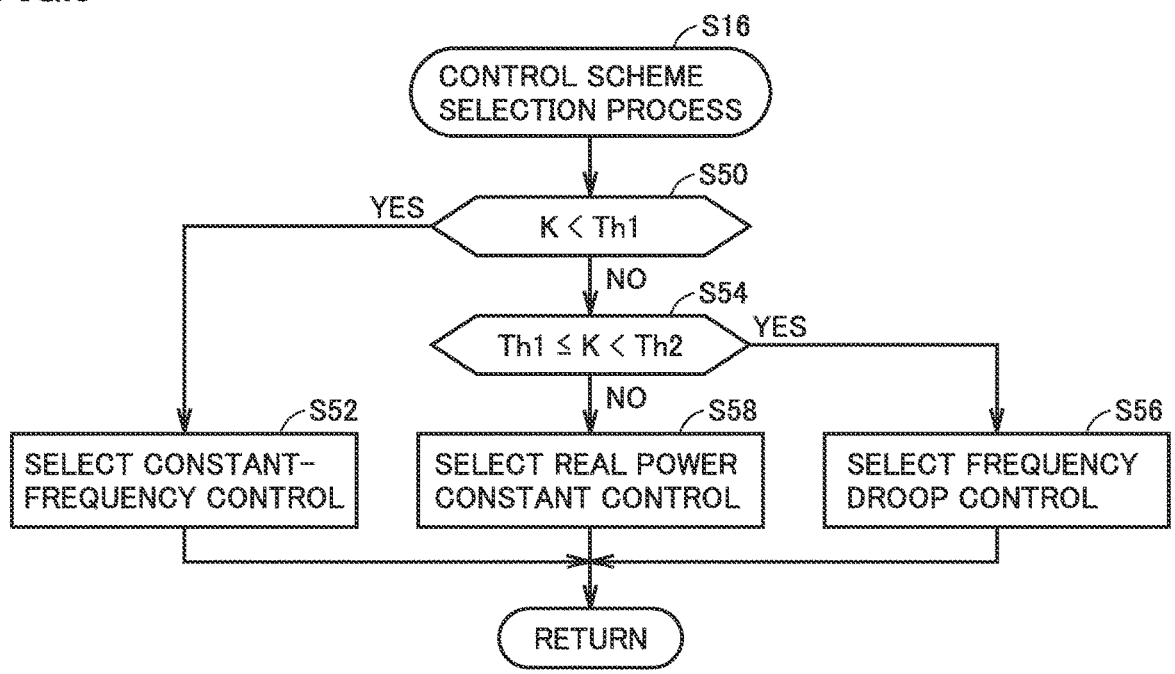
FIG. 9 is a flowchart illustrating a process for selecting a control scheme for the power converter.

Referring to FIGS. 7 through 9, process steps performed by control device 10 are described. FIG. 7 is a flowchart illustrating one example of process steps performed by control device 10. Specifically, FIG. 7 illustrates process steps that are performed by control device 10 to recover AC power system 101 from the power outage state. Here, assume a scenario that AC power system 101 is recovered from the power outage state by causing power converter 20 to operate as a power source for AC power system 101. Typically, the following steps are performed by arithmetic processing unit 70 included in control device 10.

Referring to FIG. 7, control device 10 starts and causes power converter 20 to operate in the CVCF control scheme (step S10). Specifically, control device 10 causes power converter 20 to operate so that power converter 20 outputs a voltage waveform having reference frequency Fs and a reference voltage Vs for AC power system 101. Control device 10 next performs a frequency varying process shown in FIG. 8 (step S12).

FIG. 8 is a flowchart illustrating one example of the frequency varying process. Referring to FIG. 8, control device 10 varies frequency F (here, reference frequency Fs) of power converter 20 by Δf (>0) (step S30). Specifically, control device 10 sets frequency F of power converter 20 to "Fs−Δf" or "Fs+Δf," and transmits to power converter 20 a frequency command according to this settings.

Control device 10 determines whether effective power output P of power converter 20 has reached the maximum output or the minimum output (step S32). If effective power output P is not reached the maximum output or the minimum output (NO in step S32), control device 10 ends the frequency varying process and proceeds to step S12 of FIG. 7.

In contrast, if effective power output P has reached the maximum output or the minimum output (YES in step S32), control device 10 restores frequency F to reference frequency Fs (step S34). Control device 10 next reduces the value of Δf (step S36), and performs step S30 again. In other words, control device 10 varies frequency F by Δf that is less than the previous value.

Referring again to FIG. 7, control device 10 calculates variation ΔP of the effective power output (step S12). Control device 10 calculates frequency characteristics constant K, using Equation (1) (step S14). Control device 10 next performs a process for selecting a control scheme for power converter 20, shown in FIG. 9 (step S16), and causes power converter 20 to operate in the selected control scheme (step S18).

FIG. 9 is a flowchart illustrating the process for selecting a control scheme for power converter 20. Referring to FIG. 9, control device 10 determines whether frequency characteristics constant K is less than threshold Th1 (step S50). If frequency characteristics constant K is less than threshold Th1 (YES in step S50), control device 10 selects the CVCF control scheme as the control scheme of power converter 20 (step S52).

If frequency characteristics constant K is greater than or equal to threshold Th1 (NO in step S50), control device 10 determines whether frequency characteristics constant K is greater than or equal to threshold Th1 and less than threshold Th2 (step S54).

If frequency characteristics constant K is greater than or equal to threshold Th1 and less than threshold Th2 (YES in step S54), control device 10 selects the frequency droop control scheme as the control scheme of power converter 20 (step S56).

In contrast, if frequency characteristics constant K is greater than or equal to threshold Th2 (NO in step S54), control device 10 selects the effective power constant control scheme as the control scheme of power converter 20 (step S58).

<Advantageous Effects>

According to the present embodiment, control device 10 calculates frequency characteristics constant K by periodically varying frequency F of power converter 20, and based on frequency characteristics constant K, selects a control scheme for power converter 20 which is appropriate for the current state of AC power system 101. This allows stable operation of power converter 20 connected to AC power system 101.

Moreover, since control device 10 uses only the information related to power converter 20 to select the control scheme for power converter 20 as appropriate, there is no need to obtain the command information from a higher-level device. Thus, the communication cost can be reduced. Furthermore, the present embodiment is applicable without another power source and a load being connected to AC power system 101.

[Other Embodiments]

While the above embodiment has been described with reference to power converters 20, 21 being modular multi-level converters, the present invention is not limited thereto. Power converters 20, 21 are self-excited, voltage-type AC-to-DC converters, which may be configured of a 2-level converter which converts AC power into two levels of DC power or a 3-level converter which converts AC power into three levels of DC power. Note that power converter 21 may be configured of a separately-excited, voltage-type AC-to- DC converter capable of supplying DC power to power converter 20 which is a self-excited, voltage-type AC-to-DC converter.

While the above embodiment has been described with reference to power converter 20 having the black start functionality being caused to operate as a power source for AC power system 101 when AC power system 101 is in the power outage state, the present invention is not limited thereto. For example, rather than the DC power transmission system as shown in FIG. 1, a generator may be used, instead of power converter 20, as a power source for AC power system 101 that is independent, without the presence of DC transmission line 14 and AC power system 102. In this case, control device 10 causes the generator to operate in an appropriate control scheme (e.g., the CVCF control scheme, the frequency droop control scheme, the effective power constant control scheme), based on the frequency characteristics constant, similarly to the above. As such, control device 10 functions as a device for controlling the power source (e.g., power converter 20, the generator) connected to AC power system 101.

While the above embodiment has been described with reference to power converter 21 being connected to power converter 20 via DC transmission line 14, the present invention is not limited thereto. Specifically, instead of generator 31, AC power system 102 and power converter 21, a DC power supply that is capable of supplying DC power may be connected to power converter 20 via DC transmission line 14. For example, a DC power supply, such as a storage battery, a photovoltaic device, a fuel cell, etc. is connected to power converter 20 via DC transmission line 14.

The configurations illustrated as the above embodiment are one example configuration of the present invention, and can be combined with another known technique or modified, such as some of which can be omitted, without departing from the subject matter of the present invention.

Moreover, the processes and configurations described in the other embodiments may be employed, as appropriate, in the above embodiment, and implemented.

The presently disclosed embodiment should be considered in all aspects as illustrative and not restrictive. The scope of the present invention is indicated by the appended claims, rather than by the description above, and all changes that come within the scope of the claims and the meaning and range of equivalency of the claims are intended to be embraced within their scope.

REFERENCE SIGNS LIST 4u, 4v, 4w leg circuit;
5 upper arm;
6 lower arm;
7 sub-module;
8A, 8B reactor;
9A, 9B arm current detector;
10 control device;
11A, 11B DC voltage detector;
13 interconnection transformer;
14 DC transmission line;
15 control command;
17 signal;
20, 21 power converter;
22A, 22B switching element;
23A, 23B diode;
24 DC capacitor;
25 converter circuit;
26N, 26P input-output terminal;
27 voltage detection unit;
28 transceiver;
29 gate control unit;
31, 32, 34 generator;
41 load;
51 auxiliary transformer;
52 AD converter unit;
70 arithmetic processing unit;
71 bus;
72 CPU;
73 ROM;
74 RAM;
75 DI circuit;
76 DO circuit;
77 input interface;
78 communication interface;
81 AC voltage detector;
82 AC current detector;
101, 102 AC power system;
201 frequency control unit;
203 power calculation unit;
205 arithmetic unit;
207 selection unit; and
209 command unit.

The invention claimed is:

1. A control device for controlling a power source connected to an alternating-current (AC) power system, the control device comprising processing circuitry to:
control a frequency of the power source operating in a constant-voltage constant-frequency control scheme;
calculate, when the frequency of the power source is varied, a variation of an effective power output from the power source;
calculate a frequency characteristic constant of the AC power system, based on a variation of the frequency of the power source and the variation of the effective power output from the power source; and
select a control scheme for the power source, based on the frequency characteristics constant of the AC power system.

2. The control device according to claim 1, wherein
when the frequency characteristics constant of the AC power system is less than a first threshold, the processing circuitry selects the constant-voltage constant-frequency control scheme as the control scheme of the power source.

3. The control device according to claim 2, wherein
when the frequency characteristics constant of the AC power system is greater than or equal to the first threshold and less than a second threshold greater than the first threshold, the processing circuitry selects a frequency droop control scheme as the control scheme of the power source.

4. The control device according to claim 3, wherein
when the frequency characteristics constant of the AC power system is greater than or equal to the second threshold, the processing circuitry selects an effective power constant control scheme as the control scheme of the power source.

5. The control device according to claim 1, wherein
each time a control for varying the frequency of the power source is performed, the processing circuitry updates the frequency characteristics constant of the AC power system, based on the variation of the frequency of the power source and the variation of the effective power output from the power source.

6. The control device according to claim 1, wherein
the processing circuitry calculates a frequency characteristics constant of at least one other power source connected to the AC power system by subtracting a frequency characteristics constant of a load connected to the AC power system from the frequency characteristics constant of the AC power system.

7. The control device according to claim 1, wherein
based on a speed at which at least one generator connectable to the AC power system changes output of the at least one generator, the processing circuitry sets a time period for which the frequency of the power source, resulting from varying the frequency of the power source, is maintained.

8. The control device according to claim 1, wherein
the power source is a self-excited power converter that converts power between the AC power system and a direct-current (DC) power system.

9. The control device according to claim 8, wherein
the power converter includes a first arm and a second arm,
the first arm and the second arm each include a plurality of sub-modules connected in series, and
each sub-module has a switching element, a diode, and a capacitor, the diode and the capacitor being connected in parallel with the switching element.

10. A power control system, comprising:
a power source connected to an alternating-current (AC) power system; and
a control device for controlling the power source, wherein the control device includes processing circuitry to:
control a frequency of the power source operating in a constant-voltage constant-frequency control scheme;
calculate, when the frequency of the power source is varied, a variation of an effective power output from the power source;
calculate a frequency characteristics constant of the AC power system, based on a variation of the frequency of the power source and the variation of the effective power output from the power source; and
select a control scheme for the power source, based on the frequency characteristics constant of the AC power system.

11. The control device according to claim 2, wherein
each time a control for varying the frequency of the power source is performed, the processing circuitry updates the frequency characteristics constant of the AC power system, based on the variation of the frequency of the power source and the variation of the effective power output from the power source.

12. The control device according to claim 3, wherein
each time a control for varying the frequency of the power source is performed, the processing circuitry updates the frequency characteristics constant of the AC power system, based on the variation of the frequency of the power source and the variation of the effective power output from the power source.

13. The control device according to claim 4, wherein
each time a control for varying the frequency of the power source is performed, the processing circuitry updates the frequency characteristics constant of the AC power system, based on the variation of the frequency of the power source and the variation of the effective power output from the power source.

14. The control device according to claim 2, wherein
the processing circuitry calculates a frequency characteristics constant of at least one other power source connected to the AC power system by subtracting a frequency characteristics constant of a load connected to the AC power system from the frequency characteristics constant of the AC power system.

15. The control device according to claim 3, wherein
the processing circuitry calculates a frequency characteristics constant of at least one other power source connected to the AC power system by subtracting a frequency characteristics constant of a load connected to the AC power system from the frequency characteristics constant of the AC power system.

16. The control device according to claim 4, wherein
the processing circuitry calculates a frequency characteristics constant of at least one other power source connected to the AC power system by subtracting a frequency characteristics constant of a load connected to the AC power system from the frequency characteristics constant of the AC power system.

17. The control device according to claim 5, wherein
the processing circuitry calculates a frequency characteristics constant of at least one other power source connected to the AC power system by subtracting a frequency characteristics constant of a load connected to the AC power system from the frequency characteristics constant of the AC power system.

18. The control device according to claim 2, wherein
based on a speed at which at least one generator connectable to the AC power system changes output of the at least one generator, the processing circuitry sets a time period for which the frequency of the power source, resulting from varying the frequency of the power source, is maintained.

19. The control device according to claim 3, wherein
based on a speed at which at least one generator connectable to the AC power system changes output of the at least one generator, the processing circuitry sets a time period for which the frequency of the power source, resulting from varying the frequency of the power source, is maintained.

20. The control device according to claim 4, wherein
based on a speed at which at least one generator connectable to the AC power system changes output of the at least one generator, the processing circuitry sets a time period for which the frequency of the power source, resulting from varying the frequency of the power source, is maintained.

* * * * *